US010512905B2

(12) United States Patent
Rivas-Cardona et al.

(10) Patent No.: US 10,512,905 B2
(45) Date of Patent: *Dec. 24, 2019

(54) SCR CATALYST

(71) Applicant: JOHNSON MATTHEY PUBLIC LIMITED COMPANY, London (GB)

(72) Inventors: Alejandra Rivas-Cardona, Plymouth Meeting, PA (US); Joseph Michael Fedeyko, Malvern, PA (US); Hai-Ying Chen, Conshohocken, PA (US)

(73) Assignee: Johnson Matthey Public Limited Company, London (GB)

( * ) Notice: Subject to any disclaimer, the term of this patent is extended or adjusted under 35 U.S.C. 154(b) by 760 days.

This patent is subject to a terminal disclaimer.

(21) Appl. No.: 14/559,099

(22) Filed: Dec. 3, 2014

(65) Prior Publication Data

US 2015/0151288 A1    Jun. 4, 2015

Related U.S. Application Data

(60) Provisional application No. 61/911,048, filed on Dec. 3, 2013.

(51) Int. Cl.
*B01J 29/06* (2006.01)
*B01J 29/76* (2006.01)
*B01D 53/94* (2006.01)
*B01J 37/30* (2006.01)
*B01J 37/03* (2006.01)
*B01J 37/02* (2006.01)
*C01B 39/46* (2006.01)
*B01D 53/56* (2006.01)
*B01D 53/86* (2006.01)
*B01J 37/10* (2006.01)
*B01J 35/04* (2006.01)
*B01J 37/00* (2006.01)

(52) U.S. Cl.
CPC ............ *B01J 29/763* (2013.01); *B01D 53/56* (2013.01); *B01D 53/565* (2013.01); *B01D 53/8628* (2013.01); *B01D 53/9413* (2013.01); *B01D 53/9418* (2013.01); *B01J 35/04* (2013.01); *B01J 37/0009* (2013.01); *B01J 37/0201* (2013.01); *B01J 37/0225* (2013.01); *B01J 37/0246* (2013.01); *B01J 37/036* (2013.01); *B01J 37/10* (2013.01); *B01J 37/30* (2013.01); *C01B 39/46* (2013.01); *B01D 2255/50* (2013.01); *B01D 2258/012* (2013.01); *B01J 2229/16* (2013.01); *B01J 2229/186* (2013.01)

(58) Field of Classification Search
CPC .... B01J 29/763; B01J 2229/186; B01J 35/04; B01J 37/30; B01J 37/036; B01J 37/0009; B01J 37/0201; B01J 37/10; B01J 37/0225; B01J 37/0246; C01B 39/46; B01D 53/56; B01D 53/565; B01D 53/8628; B01D 53/9413; B01D 53/9418; B01D 2255/50; B01D 2258/012
USPC ............ 502/60, 63, 64, 66, 69, 74; 423/700, 423/235, 237, 239.1, 239.2; 422/175, 180
See application file for complete search history.

(56) References Cited

U.S. PATENT DOCUMENTS

| 4,046,888 | A | * | 9/1977 | Maeshima | ......... B01D 53/8625 |
| | | | | | 423/239.1 |
| 6,709,644 | B2 | * | 3/2004 | Zones | ................ B01D 67/0051 |
| | | | | | 423/213.2 |
| 9,272,272 | B2 | | 3/2016 | Trukhan et al. | |
| 2005/0031514 | A1 | * | 2/2005 | Patchett | ............... B01D 5/0054 |
| | | | | | 423/239.2 |
| 2007/0100185 | A1 | | 5/2007 | Cao et al. | |
| 2009/0285737 | A1 | | 11/2009 | Bull et al. | |
| 2010/0092362 | A1 | | 4/2010 | Li et al. | |
| 2011/0020204 | A1 | | 1/2011 | Bull et al. | |
| 2012/0201731 | A1 | | 8/2012 | Ballinger et al. | |
| 2013/0136677 | A1 | | 5/2013 | Chandler et al. | |
| 2013/0195731 | A1 | | 8/2013 | Bull et al. | |

FOREIGN PATENT DOCUMENTS

| JP | 2011121859 A | 6/2011 |
| RU | 2156155 C2 | 9/2000 |
| WO | 2008118434 A1 | 10/2008 |
| WO | 2011064186 A1 | 6/2011 |
| WO | 2011125049 A1 | 10/2011 |
| WO | 2013050964 A1 | 4/2013 |
| WO | 2015084817 A1 | 6/2015 |

OTHER PUBLICATIONS

Guo et al. "Effect of the Nature and Location of Copper Species on the Catalytic Nitric Oxide Selective Catalytic Reduction Performance of the Copper/SSZ-13 Zeolite", ChemCatChem 2014, 6, 634-639.*
Ren et al., "Designed copper-amine complex as an efficeint template for one-pot synthesis of Cu-SSZ-13 zeolite with excellent activity for selective catalytic reduction of NOx by NH3", Chem. Commun., 2011,47, 9789-9791.*
Martinez-Franco et al., "Efficient One-pot Preparation of Cu-SSZ-13 Materials using Cooperative OSDAs for their Catalytic Application in the SCR of NOx", ChemCatChem 2013, 5, 5316-3323.*
Ren et al., "Designed copper-amine complex as an efficient template for one-pot synthesis of Cu-SSZ-13 zeolite with excellent activity for selective catalytic reduction of NOx by NH3", Chem. Commun., 47, 2011, pgs. 9789-9791.*
Ren Limin et al; Design and Synthesis of a Catalytically Active CU-SSZ-13 Zeolite From a Copper-Amine Complex Template; Chinese Journal of Catalysts, vol. 33 No. 1, pp. 92-105, Apr. 27, 2012.

* cited by examiner

*Primary Examiner* — Elizabeth D Wood

(57) ABSTRACT

A copper-CHA zeolite catalyst for SCR of $NO_x$ is disclosed.

19 Claims, No Drawings

SCR CATALYST

CROSS-REFERENCE TO RELATED APPLICATIONS

This application claims the priority benefit of U.S. Provisional Application No. 61/911,048, filed Dec. 3, 2013, which is incorporated herein by reference.

FIELD OF INVENTION

The present invention relates to catalyst comprising a transition metal containing zeolite having a CHA framework.

BACKGROUND

Zeolites are crystalline or quasi-crystalline aluminosilicates constructed of repeating $SiO_4$ and $AlO_4$ tetrahedral units. These units are linked together to form frameworks having regular intra-crystalline cavities and channels of molecular dimensions. Numerous types of synthetic zeolites have been synthesized and each has a unique framework based on the specific arrangement of its tetrahedral units. By convention, each framework type is assigned a unique three-letter code (e.g., "CHA") by the International Zeolite Association (IZA).

Synthetic CHA zeolites are produced using a structure directing agent (SDA), also referred to as a "template" or "templating agent". SDAs are typically complex organic molecules which guide or direct the molecular shape and pattern of the zeolite's framework. Generally, the SDA serves to position hydrated silica and alumina and/or as a mold around which the zeolite crystals form. After the crystals are formed, the SDA is removed from the interior structure of the crystals, leaving a molecularly porous aluminosilicate cage.

Zeolites have numerous industrial applications including internal combustion engines, gas turbines, coal-fired power plants, and the like. In one example, nitrogen oxides ($NO_x$) in the exhaust gas may be controlled through a so-called selective catalytic reduction (SCR) process whereby $NO_x$ compounds in the exhaust gas are contacted with a reducing agent in the presence of a zeolite catalyst.

ZSM-5 and Beta zeolites have been studied as SCR catalysts due to their relatively wide temperature activity window. However, the relatively large pore structures of these zeolites have a number of drawbacks. First, they are susceptible to high temperature hydrothermal degradation resulting in a loss of activity. Also, large and medium pore sizes tend to adsorb hydrocarbons which are oxidized as the temperature of the catalyst increases, thus generating a significant exotherm which can thermally damage the catalyst. This problem is particularly acute in lean-burn systems, such as vehicular diesel engines, where significant quantities of hydrocarbon can be adsorbed during cold-start. Coking by hydrocarbons presents another significant drawback of these relatively large and medium pore molecular sieve catalysts. In contrast, small pore molecular sieve materials, such as those having a CHA framework type code (as defined by the International Zeolite Association), offer an improvement in that fewer hydrocarbons are able to permeate into the framework.

To promote the catalytic reaction, transition metals may be included in the zeolite material, either as a substituted framework metal (commonly referred to as "metal-substituted zeolite") or as a post-synthesis ion exchanged or impregnated metal (commonly referred to as "metal-exchanged zeolite"). As used herein, the term "post-synthesis" means subsequent to zeolite crystallization. The typical process for incorporating a transition metal into a zeolite is by cationic exchange or impregnation of metals or precursors after the molecular sieve is formed. However, these exchange and impregnation processes for incorporating metals frequently lead to poor uniformity of metal distribution and the smaller pores of CHA type molecular sieve materials exacerbate that problem.

So-called "one pot" synthesis procedures in which a transition metal compound is present during synthesis of the molecular sieve framework vis-à-vis present as a post-synthesis ion exchanged metal. However, known one-pot processes lack sufficient control over metal loading, yield framework structures with inadequate silicon to aluminum ratios (SAR), and/or necessarily include alkali metal in the synthesis mixture which can poison acid sites and have a detrimental effect on the hydrothermal stability. Moreover, reported one-pot synthesis procedures for forming metal-containing molecular sieves have been observed to yield significant amounts, in some instances as much as 20%, of amorphous phase, copper oxides and other impurities, which negatively impact the stability and activity of the catalyst.

SUMMARY

Applicants have developed a novel catalyst useful for selectively reducing NO in an exhaust gas. The catalyst comprises a copper-containing CHA type aluminosilicate molecular sieves having molar silica-to-alumina ratio (SAR) of at least about 40, an atomic copper-to-aluminum ratio of at least 1.25, and preferably is essentially free of ion-exchanged copper and framework transition metal, and preferably contains less than 1.5 weight percent copper oxide.

According to certain aspects of the invention, the copper containing CHA zeolite can be prepared via a one-pot synthesis mixture by incorporating a metal-amine complex which serves as a first CHA framework SDA and a second, distinct CHA framework SDA. As used herein, the terms "first" and "second" with respect to SDA are used to clarify that the two SDAs are distinct compounds, but the terms do not suggest or represent the order or sequent of operation or addition to the synthesis reaction admixture. The combination of two SDAs into a single reaction mixture is referred to herein as a mixed-template and the incorporation of a transition metal into the zeolite during crystallization is referred to as one-pot synthesis. Preferably, the copper-CHA zeolite is synthesized using Cu-tetraethylenepentamine (Cu-TEPA) and N,N,N-dimethylethylcyclohexylammonium (DMECHA) as the first and second SDAs, respectively. Surprisingly, it has been discovered that the addition of very low amounts of zeolite seed crystals to the reaction mixture, particularly a reaction mixture that is free or substantially free of fluorine, results in CHA zeolite with a high molar silica-to-alumina ratio (SAR).

Accordingly, in an embodiment of the invention, provided is a catalyst composition comprising a zeolite having a CHA framework, a molar silica-to-alumina ratio (SAR) of at least 40, and an atomic copper-to-aluminum ratio of at least 1.25, preferably at least 1.5, and even more preferably at least 2.

In another embodiment of the invention, provided is a catalyst article for treating exhaust gas comprising a catalyst composition described herein, wherein the catalyst composition is disposed on and/or within a honeycomb monolith substrate.

And in yet another embodiment of the invention, provided is a method for treating an exhaust gas comprising contacting a combustion exhaust gas containing $NO_x$ and/or $NH_3$ with a catalyst article described herein to selectively reduce at least a portion of the $NO_x$ into $N_2$ and $H_2O$ and/or oxidize at least a portion of the $NH_3$.

DETAILED DESCRIPTION

In general, copper-CHA zeolites are prepared from a one-pot synthesis mixture containing a source of silica, a source of alumina, a first CHA framework organic templating agent in the form of a transition metal-amine, a second organic CHA templating agent, and seed crystals. The transition metal-amine is used to incorporate an ionic species of the transition metal, such as copper, into the channels and/or cavities of the zeolite during crystallization. The non-framework transition metal incorporated into the zeolite during its synthesis is referred to herein as in-situ metal. In certain embodiments, the silica, alumina, templating agents, and seed crystals are mixed to form a reaction mixture, for example a gel, which is then heated to facilitate crystallization. The metal-containing zeolite crystals precipitate out of the reaction mixture. These crystals are collected, washed, and dried.

As used herein, the term "CHA" refers to a CHA type framework as recognized by the International Zeolite Association (IZA) Structure Commission and the term "CHA zeolite" means an aluminosilicate in which the primary crystalline phase is CHA.

Applicants have discovered that the novel synthesis method described herein is capable of producing a high phase purity CHA zeolite, i.e., phase purities of 95% to more than 99% (as determined by Rietveld (XRD) analysis, for example). As used herein, the term phase purity with respect to a zeolite means the amount of a single crystalline phase of the zeolite (e.g., based on weight) relative to total weight of all phases (crystalline and amorphous) in the zeolite substance. Thus, while other crystalline phases be present in the CHA zeolite, the present zeolite comprises at least about 95 weight percent CHA as a primary crystalline phase, preferably at least about 98 weight percent CHA, and even more preferably at least about 99 or at least about 99.9 weight percent CHA, wherein the weight percent CHA is provided relative to the total weight of the zeolite crystalline phases present in the composition. Existing procedures for synthesizing Cu-containing CHA materials typically contain at least 10 weight percent, and even 20 weight percent impurities.

Applicants have also found that these copper-CHA zeolites have a smaller cell volume compared to other copper containing CHA zeolites. For example, the present zeolite has a unit cell volume of about 2355 to about 2375 Å$^3$, for example about 2360 to about 2370 Å$^3$, about 2363 to about 2365 Å$^3$, or about 2363.5 to about 2364.5 Å$^3$ compared to other copper zeolites which have a unit cell volume of about 2380 Å$^3$ or to aluminosilicate CHA which has a unit cell volume of about 2391.6 Å$^3$. These unit cell volumes are applicable to each of the SAR ranges and transition metal concentration ranges described herein for the present copper-CHA zeolite. It is believe that property improved the catalytic performance and/or thermal durability of the material.

Preferably, the CHA zeolite is substantially free of other crystalline phases and is not an intergrowth of two or more framework types. By "substantially free" with respect to other crystalline phases, it is meant that the present zeolite contains at least 99 weight percent CHA.

As used herein the term "zeolite" means a synthetic aluminosilicate molecular sieve having a framework constructed of alumina and silica (i.e., repeating $SiO_4$ and $AlO_4$ tetrahedral units), and preferably having a molar silica-to-alumina ratio (SAR) of at least 25, for example about 25 to about 150. This high SAR is achieved without the need for post-synthesis dealumination or framework defect healing processes. Accordingly, in certain embodiments, the catalyst described herein is free from dealumination and framework defect healing treatments, particularly post-synthesis, and such as acid treatment (e.g., acetic acid), leaching with chelating agents, or steaming (e.g., 400-650° C. steam for 8-170 hours).

The zeolites of the present invention are not silica-aluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce $NO_x$ over a broad temperature range. In certain embodiments, the amount of framework phosphorous is less than 0.1 weight percent, preferably less than 0.01 or less than 0.001 weight percent, based on the total weight of the zeolite.

Zeolites, as used herein, are free or substantially free of framework metals, other than aluminum. Thus, a "zeolite" is distinct from a "metal-substituted zeolite" (also referred to as "isomorphous substituted zeolite"), wherein the latter comprises a framework that contains one or more non-aluminum metals substituted into the zeolite's framework.

Suitable silica sources include, without limitation, fumed silica, silicates, precipitated silica, colloidal silica, silica gels, dealuminated zeolites such as dealuminated zeolite Y, and silicon hydroxides and alkoxides. Silica sources resulting in a high relative yield are preferred. Typical alumina sources also are generally known and include aluminates, alumina, other zeolites, aluminum colloids, boehmites, pseudo-boehmites, aluminum hydroxides, aluminum salts such as aluminum sulfate and alumina chloride, aluminum hydroxides and alkoxides, alumina gels.

As a first CHA SDA, a copper-amine complex is utilized. Suitable amine components for the copper-amine complex include organic amines and polyamines which are capable of directing CHA framework formation. A preferred amine component is tetraethylenepentamine (TEPA). The metal-amine complex (i.e., Cu-TEPA) may be pre-formed or formed in-situ in the synthesis mixture from individual metal and amine components.

A second CHA framework templating agent, other than the above-noted copper-amine complex, is selected for directing CHA synthesis. Suitable second organic templating agents include those having the general formula:

$$[R^1R^2R^3N—R^4]^+Q^-$$

wherein $R^1$ and $R^2$ are independently selected from hydrocarbyl alkyl groups and hydroxy-substituted hydrocarbyl groups having from 1 to 3 carbon atoms, provided that $R^1$ and $R^2$ may be joined to form a nitrogen-containing heterocyclic structure, $R^3$ is an alkyl group having 2 to 4 carbon atoms and $R^4$ is selected from a 4- to 8-membered cycloalkyl group, optionally substituted by 1 to 3 alkyl groups each having from 1 to 3 carbon atoms, and a 4- to 8-membered heterocyclic group having from 1 to 3 heteroatoms, said heterocyclic group being optionally substituted by 1 to 3 alkyl groups each having from 1 to 3 carbon atoms and the or each heteroatom in said heterocyclic group being selected from the group consisting of O, N, and S, or $R^3$ and $R^4$ are hydrocarbyl groups having from 1 to 3 carbon atoms joined to form a nitrogen-containing heterocyclic structure; and $Q^-$ is a anion. Suitable structure directing agents include N,N,N-dimethylethylcyclohexylammonium (DMECHA), N,N,N-methyldiethylcyclohexylammonium, and N,N,N-triethylcyclohexylammonium cations. Other suitable SDAs include benzyltrimethylammonium, tetramethylammonium and 1-adamantyltrimethlyammonium (TMAda), and N,N,N-triethylcyclohexylammonium cations. In certain embodiments, the second SDA is DMECHA.

The second organic template is in the form of a cation and preferably is associated with an anion which is not detrimental to the formation of the zeolite. Representative anions include halogen, e.g., fluoride, chloride, bromide, and iodide, hydroxide, acetate, sulfate, tetrafluoroborate, carboxylate, and the like. Hydroxide is the most preferred ion, particularly with respect to DMECHA. In certain embodiments, the reaction mixture and subsequent zeolite is free or essentially free of fluorine.

One-pot synthesis is conducted by combining predetermined relative amounts of the silica source, aluminum source, transition metal-amine complex, the second organic templating agent, and optionally a source of hydroxide ions such as NaOH, and seed crystals, such as CHA zeolite, under various mixing and heating regimens as will be readily apparent to those skilled in the art. The copper-CHA zeolite can be prepared from a reaction mixture having the composition shown in Table 1 (shown as weight ratios). The reaction mixture can be in the form of a solution, gel, or paste, with a gel being preferred. Silicon- and aluminum-containing reactants are expressed as $SiO_2$ and $Al_2O_3$, respectively.

TABLE 1

|  | Typical | Preferred |
| --- | --- | --- |
| SiO2/Al2O3 | 10-250 | 15-60 |
| OH—SiO2 | 0.1-1.0 | 0.2-0.7 |
| Template 1/Template 2 | 1:1 to 1:20 | 1:3-1:1.4 |
| Templates/SiO2 | 0.05-0.50 | 0.15-0.25 |
| Transition metal/Template 1 | 0.02-5 | 0.1-2 |
| H2O/SiO2 | 3-50 | 5-30 |

Reaction temperatures, mixing times and speeds, and other process parameters that are suitable for conventional CHA synthesis techniques are also generally suitable for the present invention. Without limitation, the following synthesis steps may be followed to synthesize copper-CHA zeolites according to the present invention. An aluminum source (e.g., $Al(OEt)_3$) is combined with an organic templating agent (e.g., DMECHA) in water and mixed by stirring or agitation for several minutes (e.g., about 5-30). A silica source (e.g., $SiO_2$) is added and mixed for several minutes (e.g., about 30-120 minutes) until a homogeneous mixture is formed. Then, seed crystals (e.g., chabazite), a copper source (e.g. copper sulfate) and TEPA are added to the mixture and mixed by stirring or agitation for several minutes (e.g., about 15-60 minutes). Hydrothermal crystallization is usually conducted under autogenous pressure, at a temperature of about 100 to 200° C. for a duration of several days, such about 1-20 days, a preferably about 1-3 days.

In preferred synthesis methods, CHA seed crystals are added to the reaction mixture. Applicants have unexpectedly found that the addition of a small amount of seed crystals, for example less than about 1 weight percent, such as about 0.01 to about 1, about 0.05 to about 0.5, or about 0.01 to about 0.1 weight percent, based on the total weight of the silica in the reaction mixture.

At the conclusion the crystallization period, the resulting solids are separated from the remaining reaction liquid by standard mechanical separation techniques, such as vacuum filtration. The recovered solids are then rinsed with deionized water, and dried at an elevated temperature (e.g., 75-150° C.) for several hours (e.g., about 4 to 24 hours). The drying step can be performed under vacuum or at atmospheric pressure.

The dried zeolite crystals are preferably calcined, but can also be used without calcination.

It will be appreciated that the foregoing sequence of steps, as well as each of the above-mentioned periods of time and temperature values are merely exemplary and may be varied.

In certain embodiments, a source of alkali metal, such as sodium, is not added to the synthesis mixture. The phrase "essentially alkali-free" or "alkali-free" as it is used herein means that alkali metal is not added to the synthesis mixture as an intentional ingredient. An "essentially alkali-free" or "alkali-free" catalyst as referred to herein means generally that the catalyst material contains an inconsequential level of alkali metal with regard to the intended catalytic activity. In certain embodiments, the present zeolite contains less than about 0.1 weight percent, and preferably less than about 0.01 weight percent, alkali metal such as sodium or potassium.

Applicants also discovered that the foregoing one-pot synthesis procedure permits adjusting the copper content of the crystals based on the composition of the starting synthesis mixture. For example, a desired Cu content can be directed by providing a predetermined relative amount of Cu source in the synthesis mixture, without requiring post synthesis impregnation or exchange to increase or decrease the copper loading on the material. In certain embodiments, the synthesized zeolite contains about 0.01 to about 5 weight percent copper, for example about 0.1 wt. % to about 5 wt. %, from about 0.1 to about 3 wt. %, from about 0.5 to about 1.5 wt. %, about 0.1 wt. % to about 1 wt. %, and about 1 wt. % to about 3 wt. %. For example, a controlled Cu loading of 0.3-5% by weight, 0.5-1.5% by weight or 0.5-1.0% by weight, for example, can be achieved without additional post-synthesis processing. In certain embodiments, the zeolite is free of post-synthesis exchanged metal, including copper.

The transition metal is catalytically active and substantially uniformly dispersed within the CHA framework. Here, a substantially uniformly dispersed transition metal means that the zeolite substance contains not more than about 5 weight percent transition metal in the form of a transition metal oxide (e.g., CuO), also referred to herein as a free transition metal oxide, or a soluble transition metal oxide, relative to the total amount of that transition metal in the zeolite. For example, the present zeolite contains not more than about 5 weight percent, not more than about 3 weight percent, not more than about 1 weight percent, and not more than about 0.1 weight percent, from example about 0.01 to about 5 weight percent, about 0.01 to about 1.5 weight percent, or about 0.1 to 1 weight percent CuO based on the total weight of copper in the zeolite material. Preferably, the transition metals are not introduced into the reaction mixture as a metal oxide and are not present in the synthesized zeolite crystal as a metal oxide. Applicants have found that minimizing the concentration of CuO improves the hydrothermal durability and exhaust gas treatment performance of the catalyst.

Preferably, the copper-CHA zeolite contains a majority of in-situ transition metal compared to free transition metal oxides. In certain embodiments, the catalyst contains a weight ratio of free transition metal oxides (e.g., CuO) to in-situ transition metal (e.g. ionic Cu) of less than about 1, less than about 0.5, less than about 0.1, or less than about 0.01, for example about 1 to about 0.001, about 0.5 to about 0.001, about 0.1 to about 0.001, or about 0.01 to about 0.001.

Preferably, the present zeolite does not contain framework transition metals in an appreciable amount. Instead, the copper is present as an ionic species within the interior channels and cavities of the zeolite framework. Accordingly, the copper-containing CHA zeolite is not a metal-substituted zeolite (e.g., a zeolite having a metal substituted into its framework structure) and not necessarily a metal-exchanged zeolite (e.g., a zeolite that underwent a post synthesis ion exchange). In certain embodiments, the zeolite is free or essentially free of metals other than copper and aluminum. For example, in certain embodiments, the zeolite is free or essentially free of nickel, zinc, tin, tungsten, molybdenum, cobalt, bismuth, titanium, zirconium, antimony, manganese, magnesium, chromium, vanadium, niobium, ruthenium, rhodium, palladium, gold, silver, indium, platinum, iridium, and/or rhenium. In certain embodiments, the zeolite is free or essentially free of iron. In certain embodiments, the zeolite is free or essentially free of calcium. In certain embodiments, the zeolite is free or essentially free of cerium.

The zeolite is useful as a catalyst in certain applications. The catalyst preferably is used without a post-synthesis metal exchange. However, in certain embodiments, the catalyst can undergo a post-synthesis metal exchange. Thus, in certain embodiments, provided is a catalyst comprising a CHA zeolite containing one or more catalytic metals exchanged into the channels and/or cavities of the zeolite post zeolite-synthesis in addition to in-situ copper. Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as tin, bismuth, and antimony; noble metals including platinum group metals (PGMs), such as ruthenium, rhodium, palladium, indium, platinum, and precious metals such as gold and silver; alkaline earth metals such as beryllium, magnesium, calcium, strontium, and barium; and rare earth metals such as lanthanum, cerium, praseodymium, neodymium, europium, terbium, erbium, ytterbium, and yttrium. Preferred transition metals for post-synthesis exchange are base metals, and preferred base metals include those selected from the group consisting of manganese, iron, cobalt, nickel, and mixtures thereof. Metals incorporated post-synthesis can be added to the molecular sieve via any known technique such as ion exchange, impregnation, isomorphous substitution, etc. The amount of metal post-synthesis exchanged can be from about 0.1 to about 3 weight percent, for example about 0.1 to about 1 weight percent, based on the total weight of the zeolite.

In certain embodiments, the metal-containing zeolite contains post-synthesis exchanged alkaline earth metal, particularly calcium and/or magnesium, disposed within the channels and/or cavities of the zeolite framework. Thus, the metal-containing zeolite of the present invention can have transition metals ($T_M$), such as copper, incorporated into the zeolite channels and/or cavities during synthesis and have one or more exchanged alkaline earth metals ($A_M$), such as calcium or potassium, incorporated post-synthesis. The alkaline earth metal can be present in an amount relative to the transition metal that is present. For example, in certain embodiments, $T_M$ and $A_M$ are present, respectively, in a molar ratio of about 15:1 to about 1:1, for example about 10:1 to about 2:1, about 10:1 to about 3:1, or about 6:1 to about 4:1, particularly were $T_M$ is copper and $A_M$ is calcium. In certain embodiments, the relative cumulative amount of transition metal ($T_M$) and alkali and/or alkaline earth metal ($A_M$) is present in the zeolite material in an amount relative to the amount of aluminum in the zeolite, namely the framework aluminum. As used herein, the ($T_M+A_M$):Al ratio is based on the relative molar amounts of $T_M+A_M$ to molar framework Al in the corresponding zeolite. In certain embodiments, the catalyst material has a ($T_M+A_M$):Al ratio of not more than about 0.6. In certain embodiments, the ($T_M+A_M$):Al ratio is not more than 0.5, for example about 0.05 to about 0.5, about 0.1 to about 0.4, or about 0.1 to about 0.2.

In certain embodiments, Ce is post-synthesis impregnated into the catalyst, for example by adding Ce nitrate to a copper promoted zeolite via a conventional incipient wetness technique. Preferably, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. In certain embodiments, the cerium concentration in the catalyst material is about 50 to about 550 g/ft$^3$. Other ranges of Ce include: above 100 g/ft$^3$, above 200 g/ft$^3$, above 300 g/ft$^3$, above 400 g/ft$^3$, above 500 g/ft$^3$, from about 75 to about 350 g/ft$^3$, from about 100 to about 300 g/ft$^3$, and from about 100 to about 250 g/ft$^3$.

For embodiments in which the catalyst is part of a washcoat composition, the washcoat may further comprise binder containing Ce or ceria. For such embodiments, the Ce containing particles in the binder are significantly larger than the Ce containing particles in the catalyst.

Applicants further discovered that the foregoing one-pot synthesis procedure permits adjusting the SAR of the catalyst based on the composition of the starting synthesis mixture. SARs of 40-250, 40-150, 40-100, 40-80, and 40-50, for example, can be selectively achieved based on the composition of the starting synthesis mixture and/or adjusting other process variables. The SAR of zeolites may be determined by conventional analysis. This ratio is meant to represent, as closely as possible, the ratio in the rigid atomic framework of the zeolite crystal and to exclude silicon or aluminum in the binder or, in cationic or other form, within the channels. It will be appreciated that it may be extremely difficult to directly measure the SAR of zeolite after it has been combined with a binder material. Accordingly, the SAR has been expressed hereinabove in term of the SAR of the parent zeolite, i.e., the zeolite used to prepare the catalyst, as measured prior to the combination of this zeolite with the other catalyst components.

The foregoing one-pot synthesis procedure can result in zeolite crystals of uniform size and shape with relatively low amounts of agglomeration. In addition, the synthesis procedure can result in zeolite crystals having a mean crystalline size of about 0.1 to about 10 μm, for example about 0.5 to about 5 μm, about 0.1 to about 1 μm, about 1 to about 5 μm, about 3 to about 7 μm, and the like. In certain embodiments, large crystals are milled using a jet mill or other particle-on-particle milling technique to an average size of about 1.0 to about 1.5 micron to facilitate washcoating a slurry containing the catalyst to a substrate, such as a flow-through monolith.

Crystal size is the length of one edge of a face of the crystal. Direct measurement of the crystal size can be performed using microscopy methods, such as SEM and TEM. Other techniques for determining mean particle size, such as laser diffraction and scattering can also be used. In addition to the mean crystal size, catalyst compositions preferably have a majority of the crystal sizes are greater than about 0.1 μm, preferably between about 0.5 and about 5 μm, such as about 0.5 to about 5 μm, about 0.7 to about 5 μm, about 1 to about 5 μm, about 1.5 to about 5.0 μm, about 1.5 to about 4.0 μm, about 2 to about 5 μm, or about 1 μm to about 10 μm.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, in certain embodiments provided is a catalyst article comprising a copper-CHA zeolite catalyst described herein coated on and/or incorporated into a substrate.

Certain aspects of the invention provide a catalytic washcoat. The washcoat comprising the copper-CHA zeolite catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In preferred embodiments, the washcoat loading is >0.3 g/in$^3$, such as >1.2 g/in$^3$, >1.5 g/in$^3$, >1.7 g/in$^3$ or >2.00 g/in$^3$, and preferably <3.5 g/in$^3$, such as <2.5 g/in$^3$. In certain embodiments, the washcoat is applied to a substrate in a loading of about 0.8 to 1.0 g/in$^3$, 1.0 to 1.5 g/in$^3$, or 1.5 to 2.5 g/in$^3$.

Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3/Ni$ or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. In certain embodiments the plate substrate is constructed of metal, preferably corrugated metal.

In certain embodiments, the invention is a catalyst article made by a process described herein. In a particular embodiment, the catalyst article is produced by a process that includes the steps of applying the catalyst composition, preferably as a washcoat, to a substrate as a layer either before or after at least one additional layer of another composition for treating exhaust gas has been applied to the substrate. The one or more catalyst layers on the substrate, including the present catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

In certain embodiments, the present catalyst is disposed on the substrate as a first layer and another composition, such as an oxidation catalyst, reduction catalyst, scavenging component, or $NO_x$ storage component, is disposed on the substrate as a second layer. In other embodiments, the present catalyst is disposed on the substrate as a second layer and another composition, such as such as an oxidation catalyst, reduction catalyst, scavenging component, or $NO_x$ storage component, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. In certain embodiments, the second layer is applied to an inert substrate as a bottom layer and the first layer is top layer that is applied over the second layer as a consecutive series of sub-layers. In such embodiments, the exhaust gas penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In another embodiment, the catalyst article is produced by a process that includes the steps of applying the present catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the present catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components in certain embodiments are designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

In general, the production of an extruded solid body containing the copper-CHA zeolite catalyst involves blending the catalyst, a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. The copper-CHA zeolite catalyst may also be washcoated or otherwise applied to the extruded solid body as one or more sub-layers that reside on the surface or penetrate wholly or partly into the extruded solid body.

Extruded solid bodies containing the catalysts according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the copper-CHA zeolite catalyst is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The copper-CHA zeolite catalyst described herein can also promote the oxidation of ammonia. Thus, in another embodiment, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). In certain embodiments, the present catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

In yet another embodiment, an SCR and AMOX operations are performed in series, wherein both processes utilize a catalyst comprising the copper-CHA zeolite catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, NH$_3$ may be generated over a NO$_x$ adsorber catalyst. The SCR catalyst downstream of the NO$_x$ adsorber catalyst may improve the overall system NO$_x$ reduction efficiency. In the combined system, the SCR catalyst is capable of storing the released NH$_3$ from the NAC catalyst during rich regeneration events and utilizes the stored NH$_3$ to selectively reduce some or all of the NO$_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the catalyst described herein and at least one additional component for treating the exhaust gas, wherein the catalytic article and at least one additional component are designed to function as a coherent unit.

In certain embodiments, the system comprises a catalytic article comprising a catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing NO$_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 NH$_3$/NO and 4:3 NH$_3$/NO$_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to NO$_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

What is claimed is:

1. A catalyst composition comprising a copper-containing zeolite having a CHA framework, a molar silica-to-alumina ratio (SAR) of at least 40, and an atomic copper-to-aluminum ratio of at least 1.25, wherein the zeolite is essentially free of ion-exchanged copper and the zeolite is essentially free of framework transition metal.

2. The catalyst composition of claim 1, wherein the copper-to-aluminum ratio is at least 1.5.

3. The catalyst composition of claim 1, wherein the copper-to-aluminum ratio of at least 2.

4. The catalyst composition of claim 1, wherein the SAR is 40 to 250.

5. The catalyst composition of claim 1, wherein the SAR is about 45 to 85.

6. The catalyst composition of claim 1, copper is present in an amount of about 3 to 5 weight percent, based on the total weight of the zeolite.

7. The catalyst composition of claim 1, wherein the zeolite contains less than 1.5 weight percent copper oxide.

8. A catalyst article for treating exhaust gas comprising a catalyst composition according to claim 1 disposed on and/or within a substrate.

9. The catalyst article of claim 8, wherein the substrate is a metal plate.

10. The catalyst article of claim 8, wherein the substrate is a honeycomb.

11. The catalyst article of claim 10, wherein the catalyst is a washcoat on the honeycomb.

12. The catalyst article of claim 10, wherein the honeycomb is an extruded catalyst.

13. The catalyst article of claim 10, wherein the honeycomb is a wall-flow filter.

14. The catalyst article of claim 10, wherein the honeycomb is a flow-through honeycomb.

15. A catalyst composition comprising a washcoat slurry comprising a catalyst according to claim 1 and one or more binders.

16. A method for treating an exhaust gas comprising contacting a combustion exhaust gas containing NO$_x$ and/or NH$_3$ with a catalyst composition according to claim 1 to selectively reduce at least a portion of the NO$_x$ into N$_2$ and H$_2$O and/or oxidize at least a portion of the NH$_3$.

17. A system for treating an exhaust gas containing NOx, the system comprising a catalytic article according to claim 8 and a source of a reductant, wherein the reductant source is upstream of the catalytic article.

18. A catalyst composition comprising a copper-containing zeolite having a CHA framework, a molar silica-toalumina ratio (SAR) of at least 40, and an atomic copper-to-aluminum ratio of at least 1.25, wherein the zeolite comprises a majority of in-situ copper compared to free copper oxides.

19. A catalyst composition comprising a copper-containing zeolite having a CHA framework, a molar silica-to-alumina ratio (SAR) of at least 40, and an atomic copper-to-aluminum ratio of at least 1.25, wherein the zeolite has a unit cell volume of about 2355 to about 2375 Å$^3$.

* * * * *